Patented June 14, 1927.

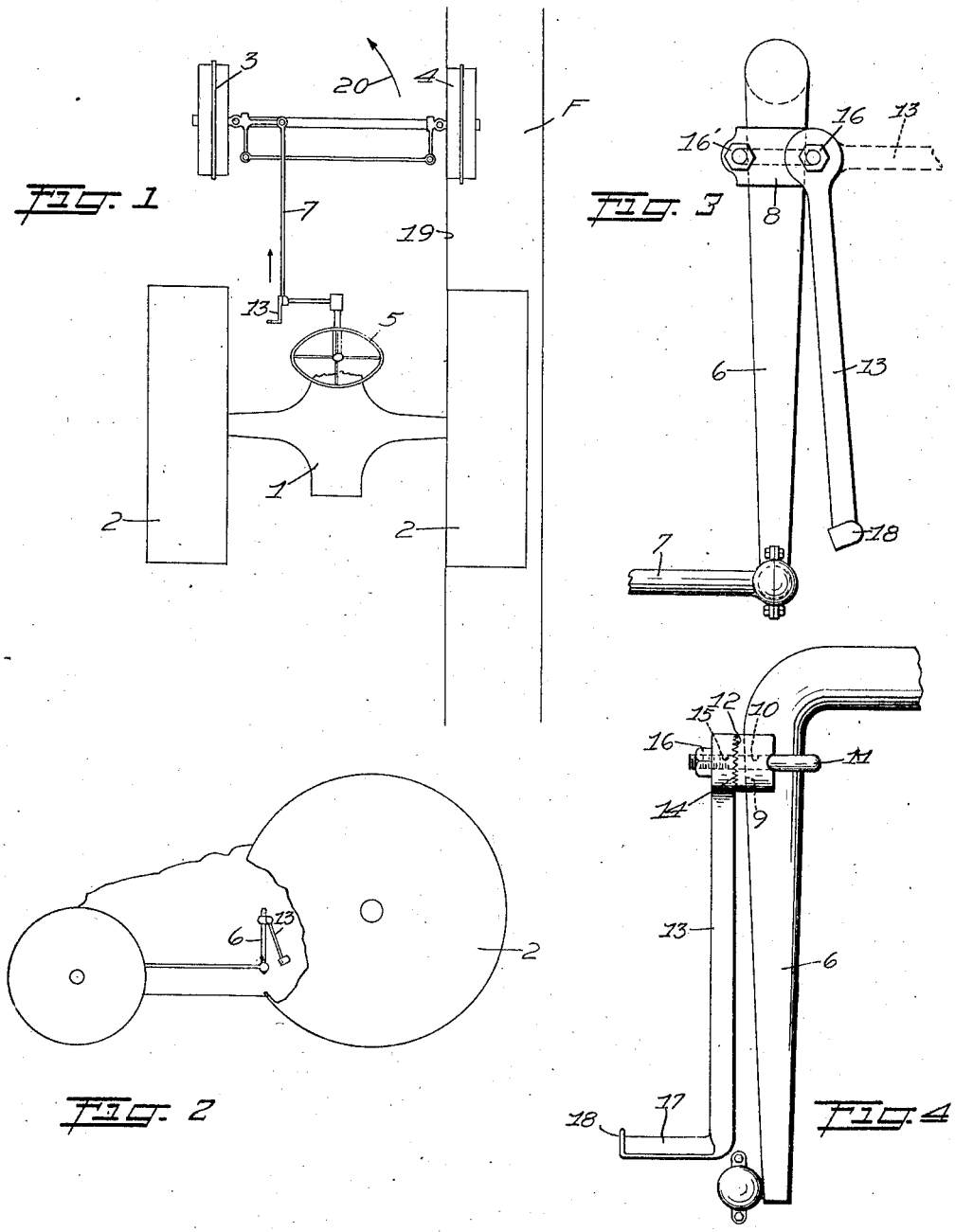

1,632,311

UNITED STATES PATENT OFFICE.

LOWELL S. PHELPS, OF LARAMIE, WYOMING.

ATTACHMENT FOR TRACTORS.

Application filed August 2, 1926. Serial No. 126,661.

My invention relates to improvements in attachments for tractors, and it consists in the combinations, constructions, and arrangements herein described and claimed.

An object of my invention is to provide an attachment for tractors which is especially adapted to be applied to Fordson tractors.

A further object of my invention is to provide a device of the type described which permits the operator to readily steer the tractor with one foot when plowing, thus relieving the operator of the strain as when steering by hand.

A further object of my invention is to provide a device of the type described which may be adjusted to any suitable position.

A further object of my invention is to provide a device of the type described by means of which the operator is relieved of hand driving for the purpose of permitting him to give his undivided attention to the operation of the plow.

A further object of my invention is to provide a device of the type described which is simple in construction, durable and efficient for the purpose intended, and which may be readily applied to a tractor.

Other objects and advantages will appear in the following specification, and the novel features of the invention will be particularly pointed out in the appended claims.

My invention is illustrated in the accompanying drawings, forming part of this application, in which—

Figure 1 is a diagrammatic plan view of the wheels and steering mechanism of a tractor with the device applied thereto, Figure 2 is a diagrammatic side view of the tractor with the device applied thereto, Figure 3 is a side elevation of the device applied to the steering mechanism of a tractor, and Figure 4 is a front elevation of the mechanism shown in Figure 3.

In carrying out my invention, I make use of a tractor 1 having rear wheels 2, and front wheels 3 and 4. A hand-controlled steering mechanism consisting of a steering wheel 5, a lever 6 and a link 7 is operatively connected to the front wheels 3 and 4, as clearly shown in Figure 1.

I provide a block 8 having an arcuate-shaped surface 9 which conforms to the lever 6. The block 8 is provided with openings 10 which are adapted to receive the ends of a U-shaped rod 11. The block 8 is further provided with a serrated portion 12 for a purpose hereinafter described.

An elongated pedal 13 is provided having a serrated portion 14 which is adapted to engage with the serrated portion 12 of the block 8, and an opening 15 which is adapted to receive one end of the U-shaped rod 11. The free ends of the rod 11 are threaded and adapted to receive nuts 16 and 16'. The free end of the foot pedal 13 is provided with an integral outwardly extending foot rest 17 and an upwardly extending stop member 18.

From the foregoing description of the various parts of the device, the operation thereof may be readily understood. The foot pedal 13 may be adjusted to any desired position relative to the lever 6 by loosening the nut 16 sufficient to permit the pedal 13 to move freely. When the foot pedal 13 has been moved to the desired position, by again tightening the nut 16, the foot pedal is rigidly held in place by means of the engaging serrated surfaces 12 and 14.

In plowing, the front wheel 4 and the aligned rear wheel 2 are disposed in a furrow F and are held adjacent the wall 19 of the furrow by means of the steering mechanism. The purpose of the attachment is to enable the operator to keep the front wheel 4 and the aligned rear wheel 2 adjacent the wall 19 by placing his left foot on the foot rest 17 of the foot pedal 13 and pressing forwardly thereupon. It is obvious that the pressure forwardly upon the lever 6 will tend to turn the wheels in the direction of the arrow 20. Very little pressure is needed to actuate the steering mechanism by means of the foot pedal, owing to the direct connection.

I claim:

1. In a device of the type described, a foot pedal, means for fastening said pedal to a steering mechanism, and means cooperating with said fastening means for securing said pedal in any desired position.

2. A device of the type described comprising a block having a serrated surface, a foot pedal having a serrated surface, and means for holding said serrated surfaces in close engagement.

LOWELL S. PHELPS.